(12) United States Patent
Eskolin et al.

(10) Patent No.: US 9,489,403 B2
(45) Date of Patent: Nov. 8, 2016

(54) METHOD AND APPARATUS FOR PROVIDING VISUAL SEARCH ENGINE RESULTS

(75) Inventors: Peter Eskolin, Pirkkala (FI); Juha Arrasvuori, Tampere (FI); Petri Piippo, Lempäälä (FI); Jussi Severi Uusitalo, Hämeenlinna (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 915 days.

(21) Appl. No.: 12/421,390

(22) Filed: Apr. 9, 2009

(65) Prior Publication Data

US 2010/0262616 A1    Oct. 14, 2010

(51) Int. Cl.
*G06F 17/30* (2006.01)
*G06Q 30/02* (2012.01)

(52) U.S. Cl.
CPC ..... *G06F 17/3028* (2013.01); *G06F 17/30244* (2013.01); *G06F 17/30247* (2013.01); *G06Q 30/0256* (2013.01)

(58) Field of Classification Search
CPC .................. G06F 17/30796; G06F 17/30424; G06F 17/30802; G06F 17/30244; G06F 17/30247; G06F 17/30256
USPC ................................................. 707/767, 754
See application file for complete search history.

(56) References Cited

U.S. PATENT DOCUMENTS

| | | | |
|---|---|---|---|
| 5,767,726 A | 6/1998 | Wang | |
| 5,893,095 A | 4/1999 | Jain et al. | |
| 6,265,934 B1 | 7/2001 | Wood | |
| 6,838,909 B2 | 1/2005 | Huang et al. | |
| 7,076,443 B1 * | 7/2006 | Emens et al. | 705/14.55 |
| 7,099,860 B1 | 8/2006 | Liu et al. | |
| 7,519,200 B2 | 4/2009 | Gokturk et al. | |
| 7,548,936 B2 * | 6/2009 | Liu et al. | |
| 7,844,591 B1 * | 11/2010 | Lettau et al. | 707/706 |
| 2002/0071615 A1 | 6/2002 | Kobayashi et al. | |
| 2004/0056725 A1 | 3/2004 | Kitamura et al. | |
| 2004/0215660 A1 | 10/2004 | Ikeda | |
| 2006/0155684 A1 | 7/2006 | Liu et al. | |
| 2006/0251339 A1 | 11/2006 | Gokturk et al. | |
| 2007/0008208 A1 | 1/2007 | Lakdawala et al. | |
| 2007/0196033 A1 * | 8/2007 | Russo | 382/305 |
| 2008/0082497 A1 | 4/2008 | Leblang et al. | |
| 2009/0144560 A1 | 6/2009 | Takenaka et al. | |

FOREIGN PATENT DOCUMENTS

WO    2007101114 A2    9/2007

OTHER PUBLICATIONS

Mei, Tao, et al. "ImageSense: Towards contextual image advertising." ACM Transactions on Multimedia Computing, Communications, and Applications (TOMM) 8.1 (2012): 6.*

(Continued)

*Primary Examiner* — Nan Hutton
(74) *Attorney, Agent, or Firm* — Ditthavong & Steiner, P.C.

(57) ABSTRACT

An approach is provided for modifying the image content of returned images resulting from a search query. The portions of each image that is unrelated to the search query is omitted or other wise obscured so as to reduce the amount of image data in the search results. Additionally, related advertising, hyperlinks, or other object can be combined with the image data to enhance the information returned to the user.

20 Claims, 20 Drawing Sheets

(56) References Cited

OTHER PUBLICATIONS

Xu, David Jingjun, Stephen Shaoyi Liao, and Qiudan Li. "Combining empirical experimentation and modeling techniques: A design research approach for personalized mobile advertising applications." Decision support systems 44.3 (2008): 710-724.*

Tsividis et al., "Strange Ways to use the MOSFET," IEEE International Symposium on Circuits and Systems, pp. 449-452, Jun. 1997, Okuda et al.

Krishnaswamy et al., "A Dual-Model 700-Mspamples/s 6-bit 200-Msamples/s 7-bit A/D Converter in a 0.25-um Digital CMOST Process," IEEE Journal of Solid State Circuits, vol. 35, No. 12, Dec. 2000, Krishnaswamy et al.

Ranganathan et al., "A MOS Capacitor-Based Discrete Time Parametric Amplifier with 1.2 V Output Swing and 3pu Power Dissipation," IEEE International Solid-State Circuits Conference, Paper 23.1, 2003, Ranganathan et al.

International search report and written opinion for corresponding International appln. No. PCT/FI2010/050196 dated Jul. 12, 2010, pp. 1-14.

"Practical Realization of the Content-Based Image Retrieval System Using Sketch and Example"; Mackowiak, S. Jaminski, T.; Content-Based Multimedia Indexing, 2007; On pp. 307-314; Publication date: Jun. 25-27, 2007; (http://ieeexplore.ieee.org/xpl/freeabs_all.jsp?tp=&arnumber=4275090&isnumber=4275037).

"Overview of Jpsearch: A Standard for Image Search and Retrieval"; Dufaux, F. Ansorge, M. Ebrahimi, T.; Content-Based Multimedia Indexing, 2007; on pp. 307-314; Publication date: Jun. 25-27, 2007; (http://ieeexplore.ieee.org/xpl/freeabs_all.jsp?tp=&arnumber=4275066&isnumber=4275037).

"Information technology—JPSearch—Part 3: Query format"; International Organization for Standardization (http://www.iso.org/iso/iso_catalogue/catalogue_ics/catalogue_detail_ics.htm?csnumber=50412&ics1=35&ics2=40&ics3).

"Practical Realization of the Content-Based Image Retrieval System Using Sketch and Example"; Mackowiak, S. Jaminski, T.; Content-Based Multimedia Indexing, 2007; On pp. 307-314; Publication date: Jun. 25-27, 2007; (http://ieeexplore.ieee.org/xpl/freeabs_all.jsp?tp=&amumber=4275090&isnumber=4275037).

"Video Search Using a Visual Dictionary"; Dumont, E. Merialdo, B.; Content-Based Multimedia Indexing, 2007; On pp. 307-314; Publication date: Jun. 25-27, 2007; (http://ieeexplore.ieee.org/xpl/freeabs_all.jsp?arnumber=4275091).

"Overview of Jpsearch: A Standard for Image Search and Retrieval"; Dufaux, F. Ansorge, M. Ebrahimi, T.; Content-Based Multimedia Indexing, 2007; On pp. 307-314; Publication date: Jun. 25-27, 2007; (http://ieeexplore.ieee.org/xpl/freeabs_all.jsp?tp=&amumber=4275066&isnumber=4275037).

"Information technology—JPSearch—Part 3: Query format"; International Organization for Standardization (http://www.iso.org/iso/iso_catalogue/catalogue_ics/catalogue_detail_ics.htm?csnumber=50412&ics1=35&ics2=40&ics3).

* cited by examiner

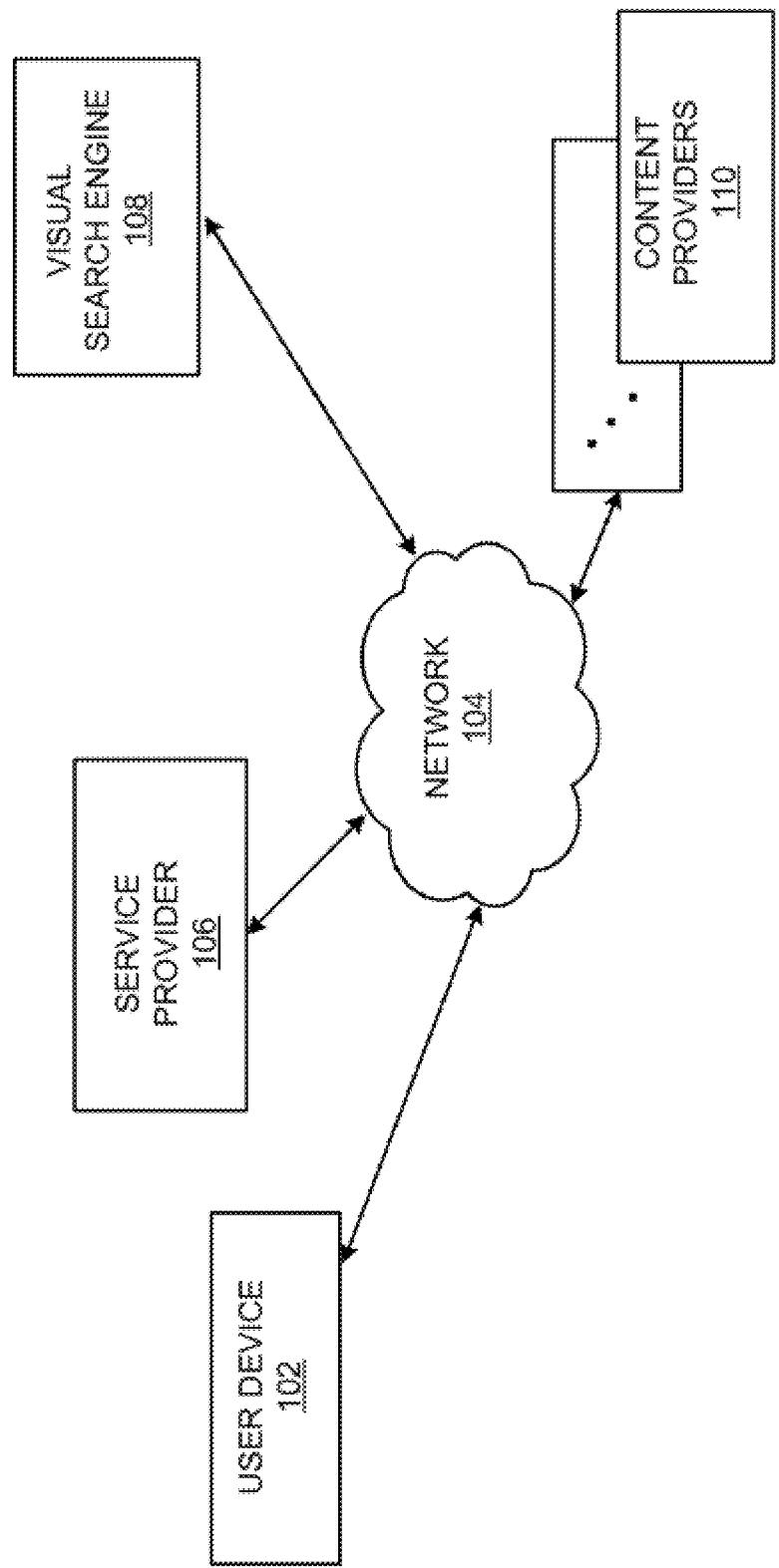

= this area also included in search results, but with a lower rank. The weight is defined with the threshold controller. The further away a matching tagged area is from the "visual search box", the lower rank it gets in the search results.

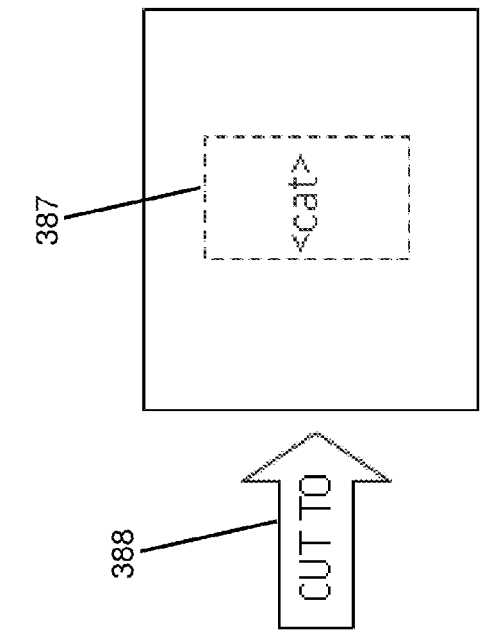
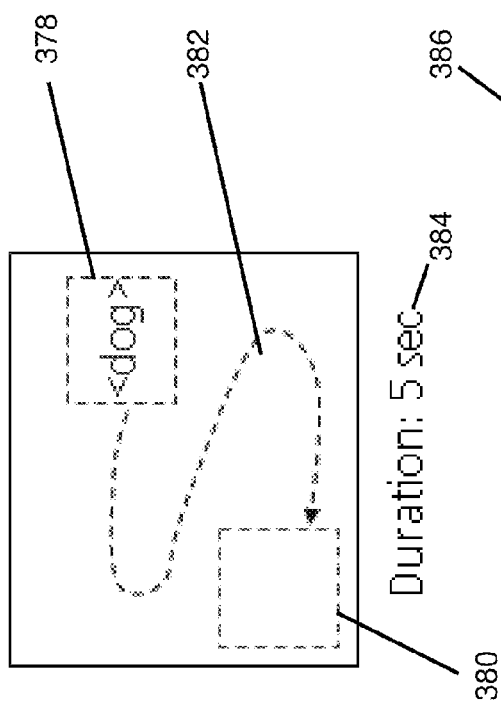

METHOD AND APPARATUS FOR PROVIDING VISUAL SEARCH ENGINE RESULTS

BACKGROUND

With the large amount of information readily available over the Internet and at large, standalone data warehouses, many users find a search engine essential is identifying relevant information when desired. Initially search engines have indexed the textual content of the different documents available, including any metadata if present. Photos and other images are becoming an increasingly important form of content in the Internet. Unfortunately, traditional search engines for visual content are imprecise, as they carry the legacy of text-based search engines. Moreover, these legacy issues are even more prominent in devices that are power constrained as well as bandwidth constrained. For example, mobile devices possess limitations such as small screen size, and relatively slow and expensive data transfer rates.

SOME EXEMPLARY EMBODIMENTS

Therefore, there is a need for an approach for allowing a user to search for and retrieve image content in a manner that reduces the amount of image data based on what is more relevant to a particular search.

According to one embodiment, a computer-readable medium carries one or more sequences of one or more instructions which, when executed by one or more processors, cause the one or more processors to identify, for each image in a first set of one or more images, a respective portion of each image relevant to a search query; extract, for each image in the first set of one or more images, the respective portion to generate a respective extracted image portion; and generate a second set of one or more images, wherein each image of the second set corresponds, respectively, to one of the extracted respective portions.

According to another embodiment, an apparatus comprises a processor and a memory storing executable instructions that if executed cause the apparatus to identify, for each image in a first set of one or more images, a respective portion of each image relevant to a search query; extract, for each image in the first set of one or more images, the respective portion to generate a respective extracted image portion; and generate a second set of one or more images, wherein each image of the second set corresponds, respectively, to one of the extracted respective portions.

According to another embodiment, an apparatus comprises means for identifying, for each image in a first set of one or more images, a respective portion of each image relevant to a search query; means for extracting, for each image in the first set of one or more images, the respective portion to generate a respective extracted image portion; and means for generating a second set of one or more images, wherein each image of the second set corresponds, respectively, to one of the extracted respective portions.

According to another embodiment, an apparatus comprises a processor and a memory storing executable instructions that if executed cause the apparatus to at least: transporting a search query to a visual search engine, the search query including one or more keywords; and providing a set of one or more images as results to the search query, wherein each image of the results includes a portion related to the search query and omits a portion unrelated to the search query.

According to another embodiment, an apparatus comprises a processor and a memory storing executable instructions that if executed cause the apparatus to at least: transport a search query to a visual search engine, the search query including one or more keywords; and provide a set of one or more images as results to the search query, wherein each image of the results includes a portion related to the search query and omits a portion unrelated to the search query.

According to yet another embodiment, for a method comprises transporting a search query to a visual search engine, the search query including one or more keywords; and providing a set of one or more images as results to the search query, wherein each image of the results includes a portion related to the search query and omits a portion unrelated to the search query.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 1A is diagram of a communications system capable of providing a visual search engine, according to an exemplary embodiment;

FIG. 3I and FIG. 3J are examples of a visual search engine user interface related to searching video content in accordance with one embodiment;

DESCRIPTION OF PREFERRED EMBODIMENT

Figure 1B:
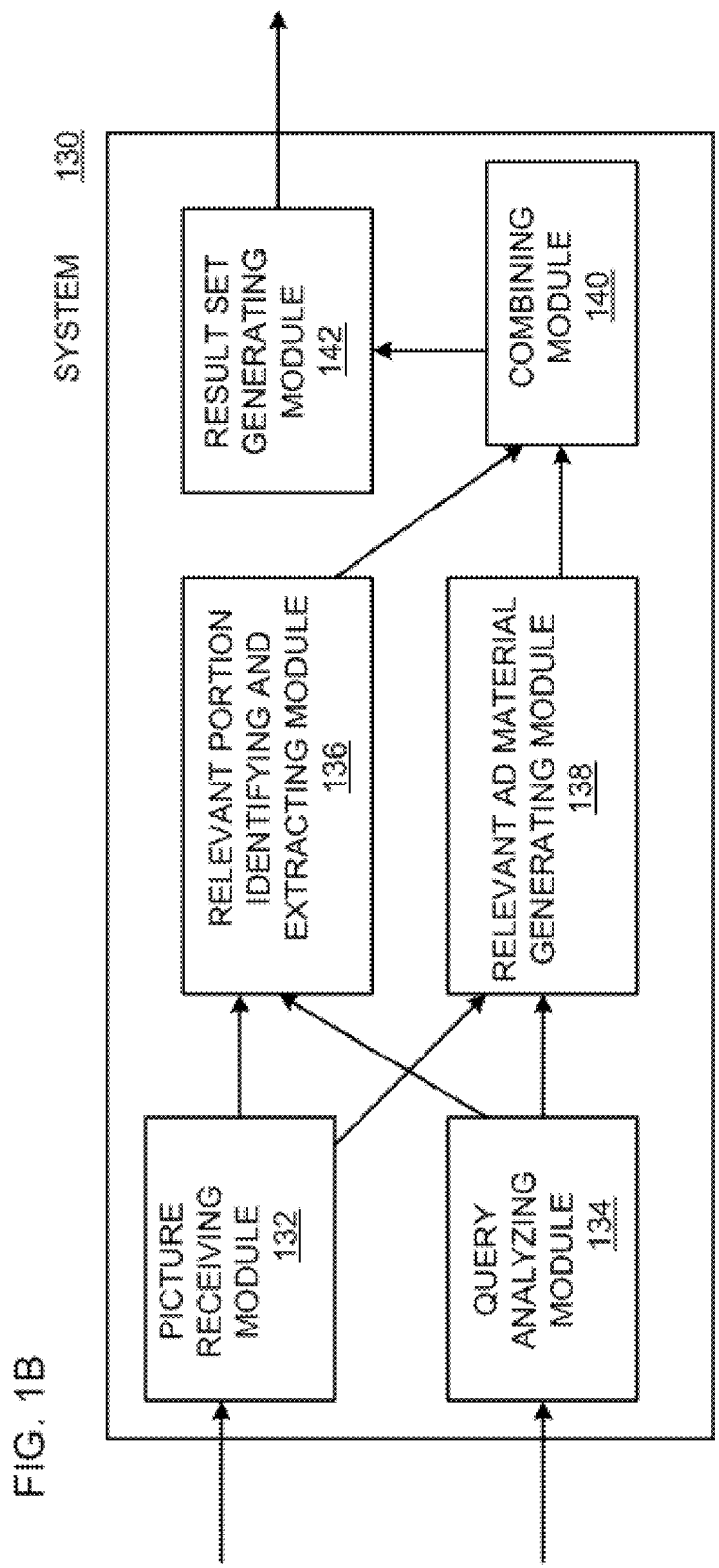
FIG. 1B is a diagram of functional components of a system for modifying image content, in accordance with one embodiment.

A method and apparatus for modifying the image content of the results from a search query are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

FIG. 1A is diagram of a communications system capable of providing a visual search engine, according to an exemplary embodiment. In the system 100, a user device 102 is operated by a user to access various resources available over the network 104. In particular, the user device 102 may rely on a service provider 106 to provide access to the network 104. The user device 102 can any type of mobile terminal, fixed terminal, or portable terminal including mobile handsets, stations, units, devices, multimedia tablets, Internet nodes, communicators, desktop computers, laptop computers, Personal Digital Assistants (PDAs), or any combination thereof. It is also contemplated that the UEs 101a-101n can support any type of interface to the user (such as "wearable" circuitry, etc.). In the case of a mobile device such as a cellular telephone, a particular carrier may provide service such that the user device 102 can have network access. Using this ability to access the network 104, the user device 102 can communicate with other computers and systems. One example of such a system is a search engine 108. In particular, the search engine 108 may permit searching for images and other visual information such as video content.

It is recognized that storing, searching and retrieving image or video data has become a popular application. In many instances, regions of an image are identified and associated with keywords or "tags". Thus, a traditional keyword search query can be provided to a search engine and image data can be located that have one or more tags that match the query keywords meaning that the visual content of an image matches the keywords. Because image and video data can be much larger in size that textual content, returning image data as search results can be slow and cumbersome depending on the speed and capacity of the network connection over which the image data travels. Allowing image data to be searched and retrieved in the same manner as textual information expands the type of content available for users; however, this additional content can sometimes degrade the apparent quickness and responsiveness of a user's network experience.

Typically, a user device 102 sends a search query to the search engine 108 which then identifies and returns relevant search results such as, for example, images that are relevant to the search query. The content that the search engine 108 searches through may be stored locally or may be stored at other content providers 110 available over the network 104.

By way of example, the communication network 104 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), the Internet, or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, mobile ad-hoc network (MANET), and the like.

As one example, the visual search engine 108 may be a site that allows users to store photos, images, and other similar information. By way of example, when users upload the photos, each photo can be tagged with one or more keywords that relate to the contents of the photo. Other types of images and visual information, in addition to only photos, may be present as well. Part of tagging an image may also include associating regions of the image with a tag or keyword as well. As a result, the metadata associated with an image may include relevant keywords and also image position coordinates associated with the keywords.

In one embodiment, when a user invokes the search engine 108, the user can enter keywords and even image coordinates to identify relevant photos and images. The search engine 108 locates the relevant images and returns them as a result set to the user. The search engine 108, in at least some embodiments, will rank the search results in terms of relevance or some other criteria (e.g., date, size, file type, etc.)

The search engine 108, as more fully described later, may manipulate the search results and add or remove content from the images of the search results if desired. Because the search results may also be returned through the service provider 106 as an intermediate step before being forwarded to the user device 102, the service provider 106 may also manipulate the images of the search results as well.

Although FIG. 1A specifically illustrates a network platform, the above-described operation can also be performed by a user that is physically located near the search engine 108 and uses a local user interface rather than a device 102 that communicates through the network 104.

The processes described herein for manipulating the images returned from a search engine may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below. FIG. 1B is a diagram of functional components of a system for modifying image content, in accordance with one embodiment. The functional components of the system 130 may be implemented in any of these configurations.

A picture receiving module 132 receives a set of images that were determined to be relevant to a search query. The set of images may be zero or may include hundreds of images. There is also a query analyzing module 134 that analyzes query information. This query information may be explicitly provided to the module 134 or may be extracted from tag information within the images received by receiving module 134. In some embodiments, each of the received images will include one or more portions that have corresponding tags and the query will have one or more keywords likely related to the tags.

Based on one or more of the query, the tags and the images, relevant portions of each image are identified and extracted from the image by a module 136. Also, based one or more of the query, the tags and the images, relevant additional materials (e.g., advertisements) are generated by a generating module 138. Generating of the additional material may include retrieving preconfigured material or constructing the additional material from other sources of information. A combining module 140 receives the additional material for an image and the extracted portions of that image and combine them into a combined image. The set of combined images are then assembled to form a result set. This assembling function is performed by a result set generating module 142. Once assembled, other components can then transmit or forward the result set to an end user or other system.

Figure 2A:
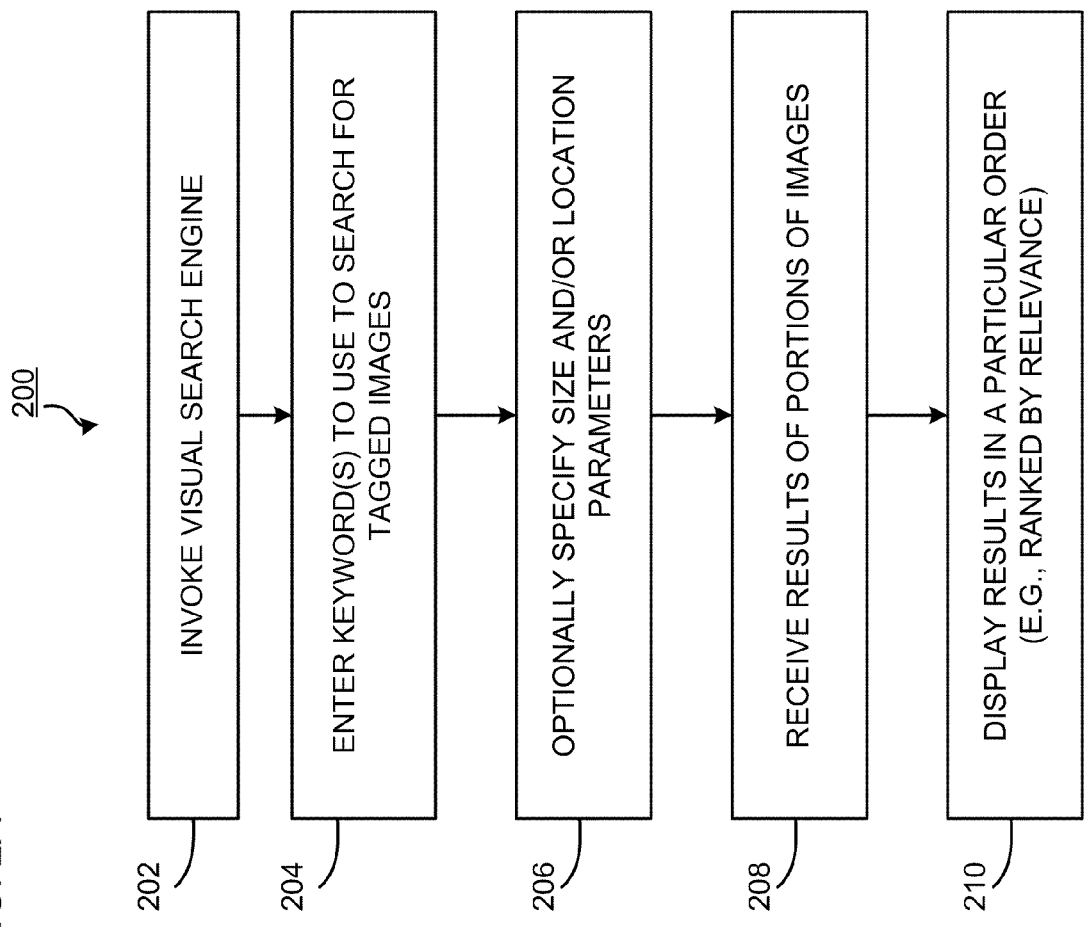
FIG. 2A is a flowchart of a process for receiving relevant portions of images, in accordance with one embodiment.

FIG. 2A is a flowchart 200 of a process for receiving relevant portions of images, in accordance with one embodiment. According to step 202, a user invokes a visual search engine (e.g., engine 108 of FIG. 1). As mentioned above, such a search engine 108 allows a user to query and retrieve visual information such as images, video, photos and the like. In general, a query takes the form, in step 204, of entering keywords that describe the content of an image. Before such a query can provide useful results, each image is associated with one or more tags or keywords related to its content. For example, a picture of a dog catching a frisbee in a park may include the tags: "dog", "playing", "frisbee", "outside", "park", "grass", etc. Thus, a search query including such keywords would result in a search engine locating this image as relevant to the search.

In step 206, optional items can be included as part of the search query as well. These optional items are associated with each tag and can further describe the portion of the image associated with that tag. As a result, the tags identified above can have associated parameters as well. Two examples of additional information may be a "size" parameter and a "location" parameter. In forming a search query, then, a user can specify a keyword as well as additional parameters associated with that keyword. The size parameter may, for example, be a percentage relative to an image (e.g., "greater than 50%") or some other fixed quantity. Thus, the search query can request images that include a portion having a dog wherein that portion is more than half the image. Such a query is likely to return a majority of images where a dog is the primary subject of the image rather than merely a secondary subject.

As for the "location" parameter, it can be specified as the boundary points of a rectangle (or other shape) or the center coordinates of a particular portion or any other way of specifying a region within an image. For example, if a user is searching for an image, the user can faintly remember having a dog in the bottom right corner, then they can limit the search query to omit images having a tag "dog" but wherein the tagged portion is somewhere other than the bottom right corner.

In specifying the "size" or "location" parameter in forming the query, the user may do so using numeric, or similar, input; or may be provided with a graphical interface to do so. For example, the user may be presented with a blank image template on which they can drag a box in order to specify a location and/or a size for a keyword in the query. The user can also be permitted to set a relevance parameter as well so that they have some control over the number of images returned by the search engine.

Based on the keywords, and any other parameters, search results are received by the user, in step 208, in response to the query. In particular, according to an embodiment, instead of receiving the entire image for every image that the search engine considered relevant, the search results omit those portions of each image that are not relevant to the query keywords. Thus, a search for a "dog" would result in a number of images of dogs that have been extracted from a larger image that may have other tagged portions such as "trees", "frisbee" etc. that are not returned as part of the images in the search results. Accordingly, the image information received by the user can be dramatically less than if each entire image was returned in the search results. Ultimately, in step 210, the user can operate an interface that displays the search result images. The images may, for example, be displayed in relevance order with the images most closely matching the search query displayed first.

Figure 2B:
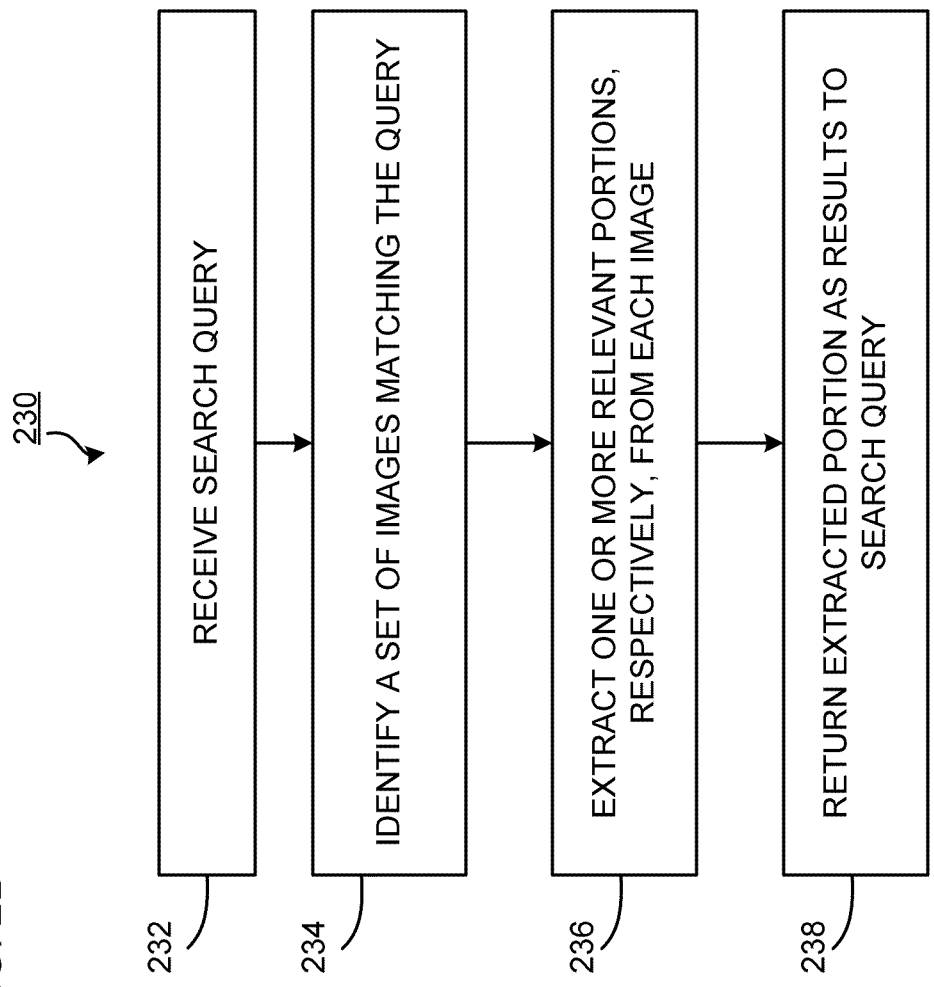
FIG. 2B is a flowchart of a process for extracting and returning relevant portions of images, in accordance with one embodiment.

FIG. 2B is a flowchart 230 of a process for extracting and returning relevant portions of images, in accordance with one embodiment. In step 232, a search query is received and used, in step 234, to identify relevant, or matching, images. As described above, the search query may be keywords that correspond to tagged portions within an image and may also include additional parameters that further refine the query. From the set of matching images that are identified, the relevant portions of each image are extracted, in step 236. Because the search query may include one or more keywords, there may one or more extracted portions for each image also. In step 238, the extracted portions of the relevant images are returned as results to the search query.

Figure 3A:
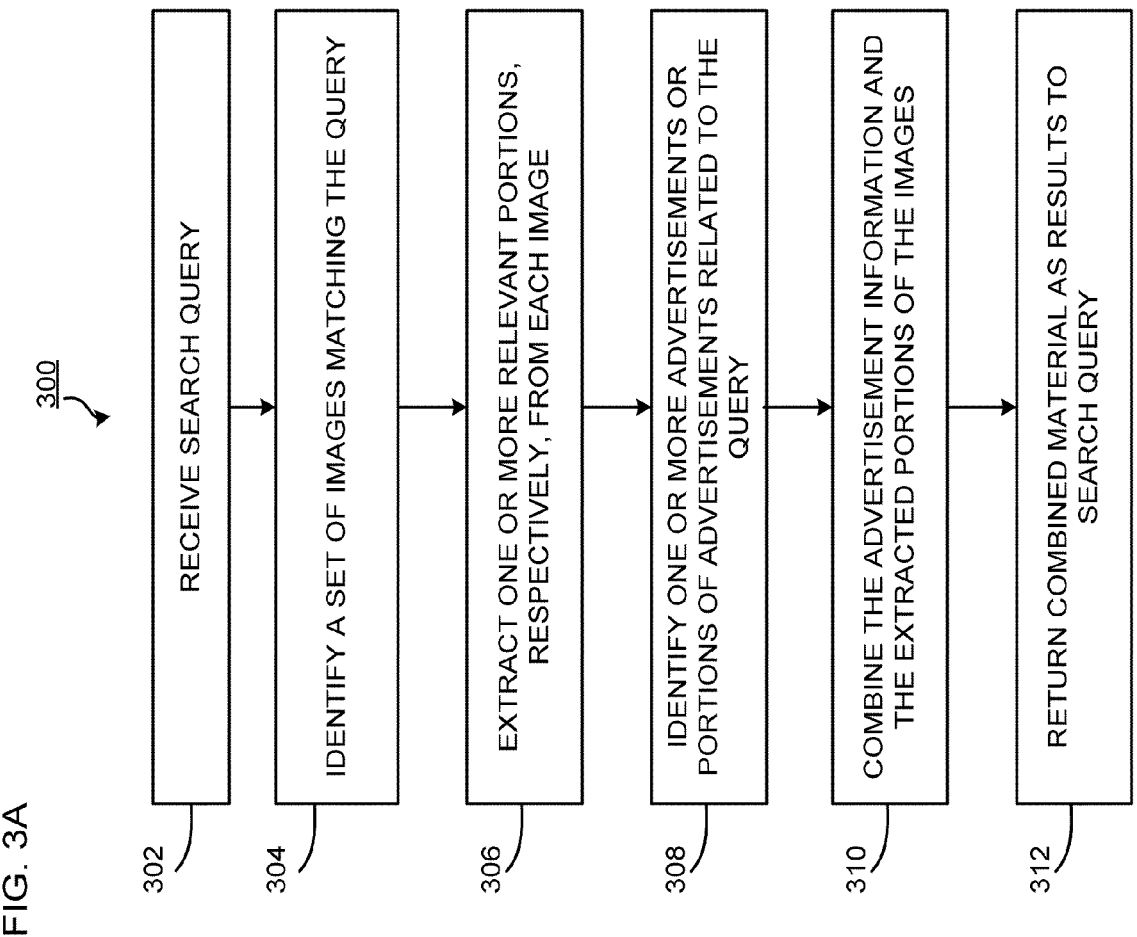
FIG. 3A is a flowchart of a process for combining objects and relevant portions of images, in accordance with one embodiment.

FIG. 3A is a flowchart 300 of a process for combining objects and relevant portions of images that can be used to implement an embodiment of the invention. In addition, to reducing the image data that is returned as search results, embodiments also contemplate adding relevant information to the extracted image portions as well.

In steps 302, 304, and 306 a search engine receives a query, identifies matching images and extracts relevant portions from each image. Instead of sending these extracted portions directly as search results, they are combined with other objects. In one example, the added objects include related advertising information. Such objects could also include hyperlink to related content, embedded video data, or additional multimedia content.

In step 308, one or more advertisements are identified that relate to the search query or to the tags associated with the extracted portions. For example, if the extracted portion has a corresponding tag of "dog", then pet related advertisements may be identified and combined with one or more of the extracted images within the search results. If the search query keywords included "dog" and "tree", then pet related advertisements can still be identified and combined even if the tag of the extracted portion is "tree". Thus, just the extracted portion tag may be used to identify related advertisements or the query keywords may be used as well.

The form of the object combined with each extracted image can vary greatly. For example, the advertisement may be a image of a logo that is overlayed on the extracted image portion. It may be test information overlayed or embedded hyperlinks that are visible or only become visible when a cursor hovers over the image portion. Also, the advertisement objects may be designed specifically for use in a system that adds advertisements to search engine results or the advertisement objects can themselves be extracted from general visual advertisements created for an independent purpose. Thus, when identifying a related advertisement, a system can locate specific, pre-made images or objects and combine those with the extracted portions in the search results. Alternatively, the system could search through advertising images, extract relevant portions of those advertising images and combine only the extracted advertising portions with the extracted portions of the search results.

Regardless of how the system identifies the related advertisement information, this information is combined, in step 310, with one or more of the extracted portions of images within the search results. It is this combined material that, in step 312, is returned to a user as the results to their query. Each extracted image portion may be combined with an advertising object or only selected ones may be combined with an advertising object. Also, more than one advertising object may be added to an extracted image portion.

Figure 3B:
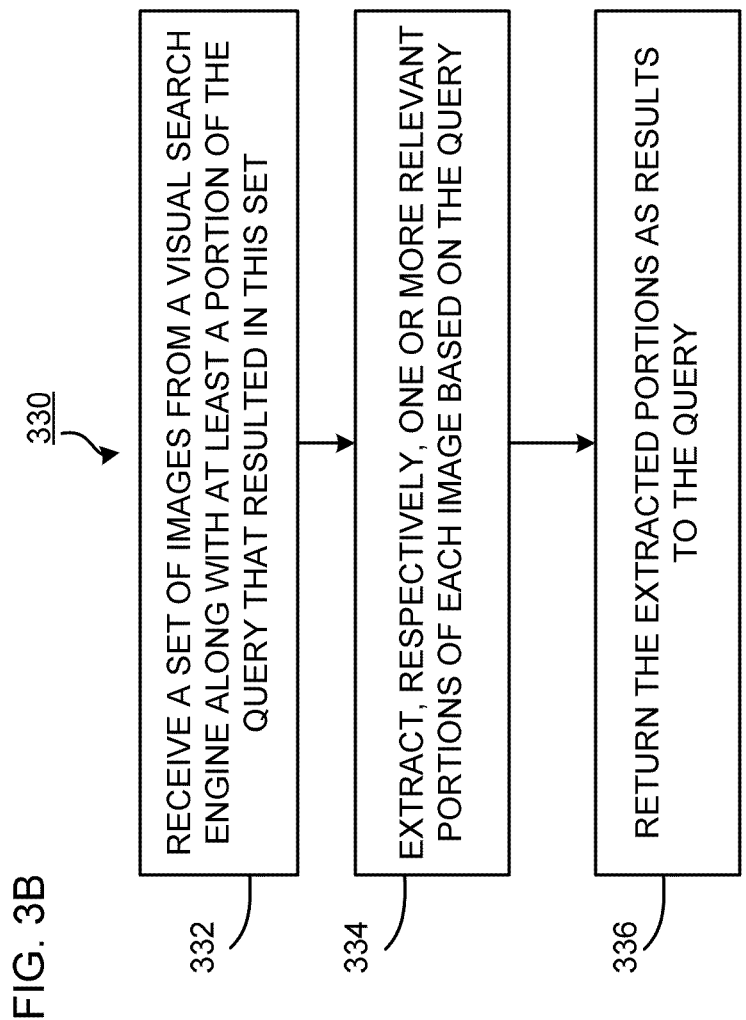
FIG. 3B is a flowchart of a process for extracting and returning relevant portions of images, in accordance with one embodiment.

FIG. 3B is a flowchart 330 of a process for extracting and returning relevant portions of images that can be used to implement an embodiment of the invention. The extraction of the relevant portions of the images matching a search query may be performed by the search engine or it may be performed by some intermediary in the communications path between the end user and the search engine, including the end user device if it has the appropriate capabilities. In such an arrangement, a set of images are received from the search engine, in step 332, along with at least a portion of the search query. For example, the images will each have one or more associated tags that correspond to at least a portion of the search query. In addition, the search engine may separately return the search query string that resulted in the set of images being received. If an intermediary device is involved, then the search query may be received from the user, forwarded to the search engine in the course of normal communication, and then matched to the search results when they are received. By any of these techniques, knowledge about the search query producing the resulting images is provided. Based on the search query, in step 334, one or more portions from each image relevant to the search query are extracted. It is these extracted portions that are returned as images to user, in step 336. For example, portions of an image that have a tag which match a keyword in the search query can be extracted. If more than one extracted portion is generated from a single image, then these extracted portions may be sent as separate images in the result set or sent as a combined, single image in the result set.

Figure 3C:
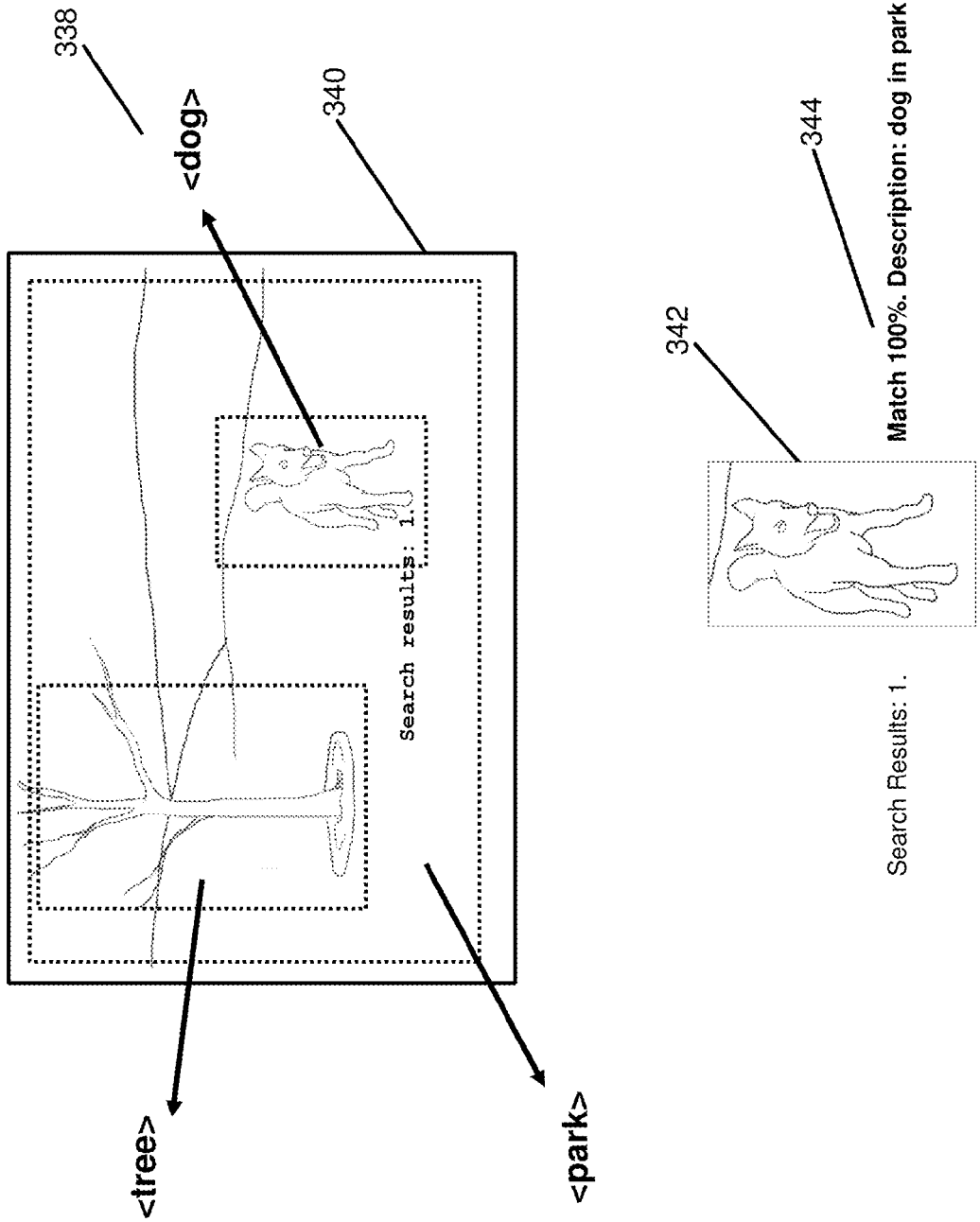
FIG. 3C is an example of graphical search results returned in response to a query in accordance with one embodiment.

FIG. 3C shows one example of how search results may be returned to an end user. The image 340 has a number of tags 338 associated with different portions of it such as <dog>, <park>, and <tree>. Therefore, the image 340 would be determined to be relevant to a search query involving keywords such as "dog". As a result, the portion of the image 340 tagged with "dog" is returned to the user and can be accompanied by a label 344 if desired. By omitting the other portions of the image 340, the amount of information transmitted to the end user may be decreased.

Figure 3D:
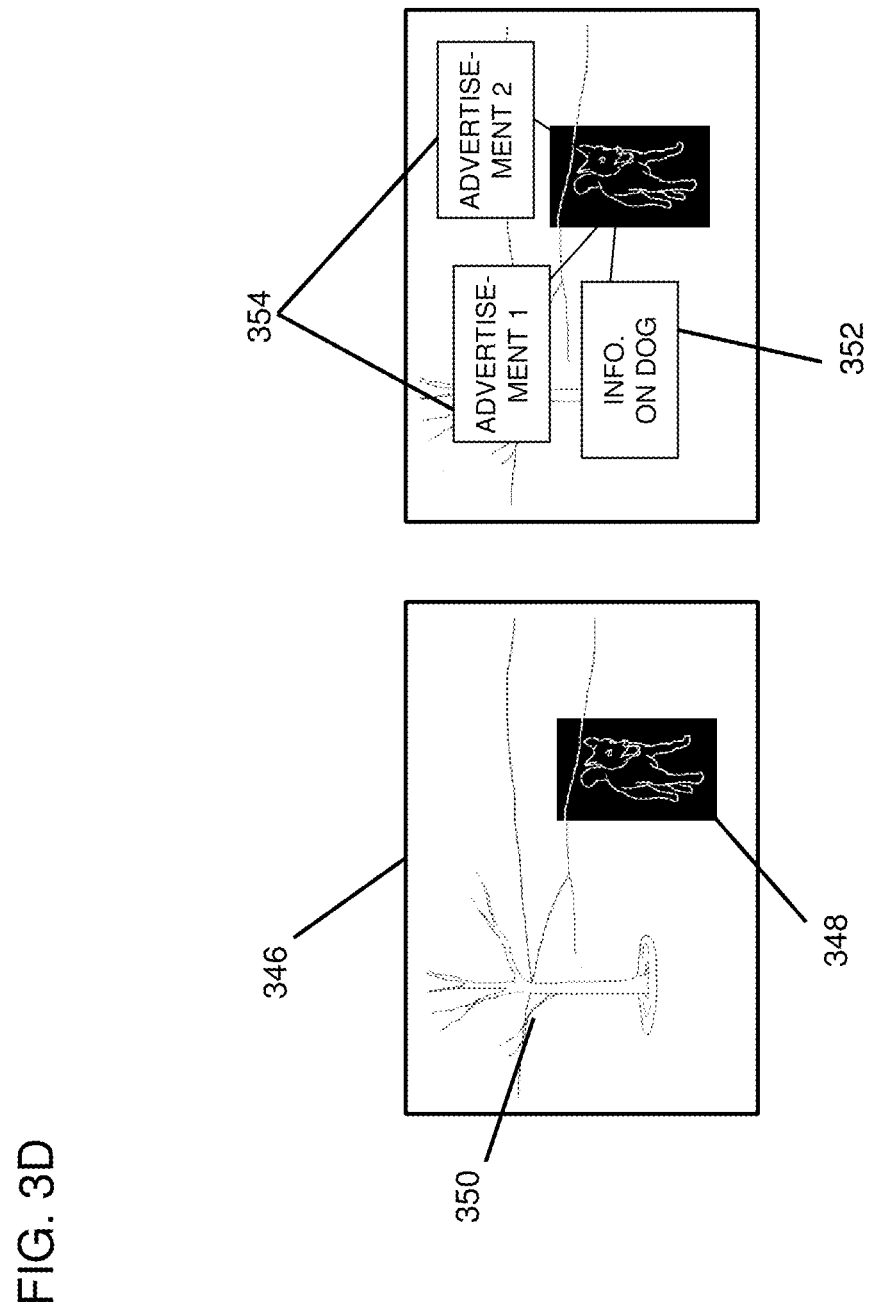
FIG. 3D is an example of graphical search results returned in response to a query in accordance with another embodiment.

FIG. 3D shows an alternative example of how to format and return the search results. In this example, an image 346 may be returned that has an emphasized region 348 and an obscured, or deemphasized, region 350. As a result, the portion 348 with the tag "dog" is seen in clear detail while the remaining portion 350 of the image 346 is almost unnoticeable. As a result, information about dogs 352 or a hyperlink to information about dogs can be added to the image 346. Advertisements 354, or links to advertisements, may be added as well. Because of the deemphasized nature of the region 350, the information 352 and advertisements 354 can be seen in an uncluttered manner.

Figure 3E:
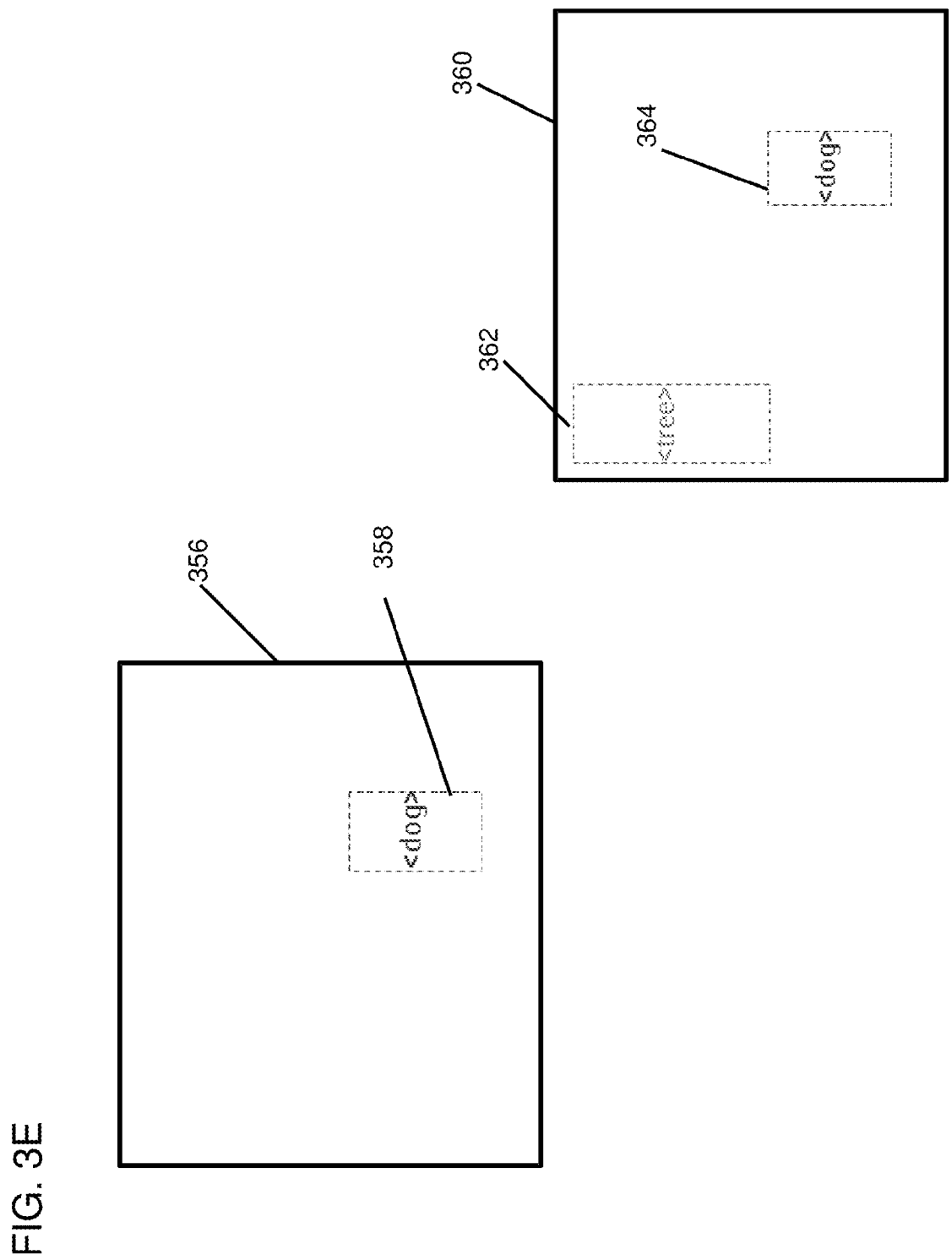
FIG. 3E is an example visual search engine user interface in accordance with one embodiment.

FIG. 3E depicts one example of a user interface 356 useful for forming queries to submit to a visual search engine. In the user interface, the user can drag and draw a search box 358 along with adding one or more keywords "dog" as shown in the figure. The search box 358 can be dragged into a desired position within the interface 356 and also be sized as desired. The interface 360 depicts that not only can one search box be defined but two separate search boxes 362, 364 (or more) can be used to form a query. Each box 362, 364 can independently have different sizes, positions, and keywords.

Figure 3F:
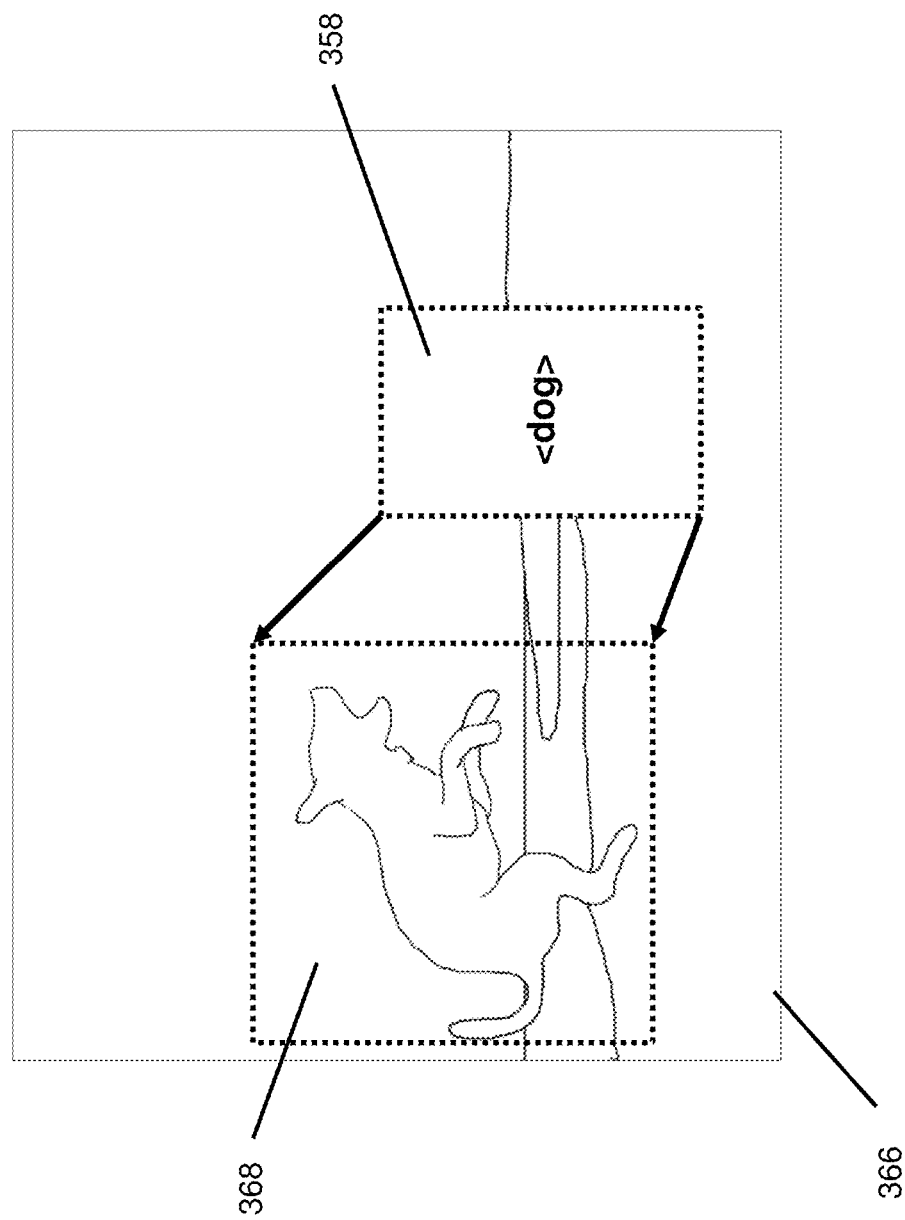
FIG. 3F is an example of graphical search results returned in response to a query in accordance with one embodiment.
Figure 3H:
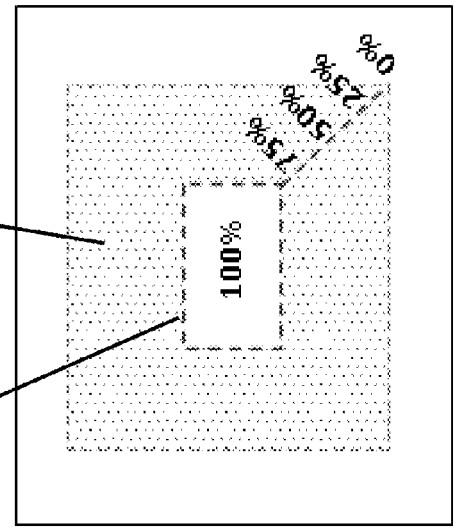
FIG. 3G and FIG. 3H are examples of a visual search engine user interface with a search threshold controller in accordance with one embodiment.
Figure 3G:
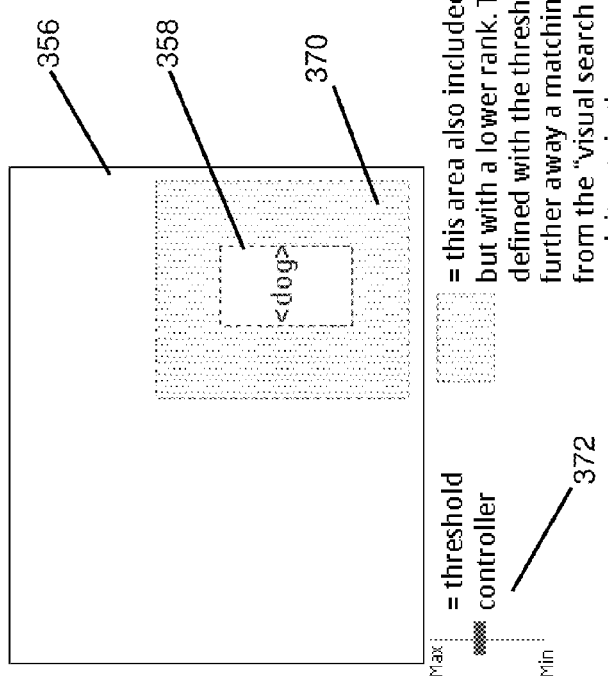

FIG. 3F depicts one example of an image 366 that may be considered relevant the search query of FIG. 3E having a search box 358 for a "dog". The image 366 includes a portion 368 that is tagged as being a "dog". As shown, the portion 368 is not exactly in the place of the search box 358, nor is it the same size as the search box 358. Thus, the search engine does not only find exact matches but may find images that are different but similar to the search query. FIGS. 3G and 3H depicts one example of a user interface that allows a user to have some control over what images are considered "similar" and what images should be considered unrelated to the query. The user interface 356 and the search box were introduced with respect to FIG. 3E, in this case, however, a region 370 is included that is controlled by a threshold controller 372. Using a sliding bar or other interface component, a user can determine how large to make the region 370 that surrounds the search box 358.

Using the threshold controller 372, the user can thereby control which images are considered to have satisfied the search query by controlling the size of the region 370. Images with matching tagged portions within region 370 but not within search box 358 are still returned as results for the search. As for ranking such images, the further the tagged portion is from the search box 358, the lower an image is ranked in the result set. This is depicted in FIG. 3H with a search box 374 surrounded by a region 376. The percentages depicted in the region 376 show how a matching image would be weighted, or ranked, in the search results.

FIG. 3I is an example of a user interface for forming a query to submit to a search engine that can search video content. The user interface of FIG. 3I allows a user to define an initial search box 378. As before, the search box 378 can be sized, positioned and tagged to define the search criteria. Next, an ending search box 380 can be defined in a similar manner. Submitting this query to a search engine would cause the search engine to search for video sequences in which there is an image having a dog positioned near the area of search box 378 and then some later image in the sequence where the dog is located near the ending search box 380. This type of searching may be further refined by adding additional criteria to the search query. For example, a path 382 may be drawn or otherwise added to depict that the search query is limited to searching for dogs that travel roughly in the pattern or path 382 between the two boxes 378 and 380. When the user draws the path 382, they may include an indication of direction as the way to define which search box (378, 380) is the starting box and which is the ending box. The user may also define a duration 384 to further refine the search criteria. The "duration" 384 indicates the approximate time in the video sequence between when the dog is at the position of the search box 378 and when it appears at the ending search box 380.

FIG. 3J is an example of a user interface for forming a query to submit to a search engine that can search video content or content such as slideshows. This interface allows the user to specify an initial image 386 and a second image 387. Then the user specifies a transition method 388. Transition methods can include such methods as cut-to, fade, wipe, directional wipes (e.g., from the right, from the top), interleaving, etc. As a result of such a search query, a search engine will locate sequences of images that match the starting and ending image criteria as well as the transition method specified in the query.

Figure 3K:
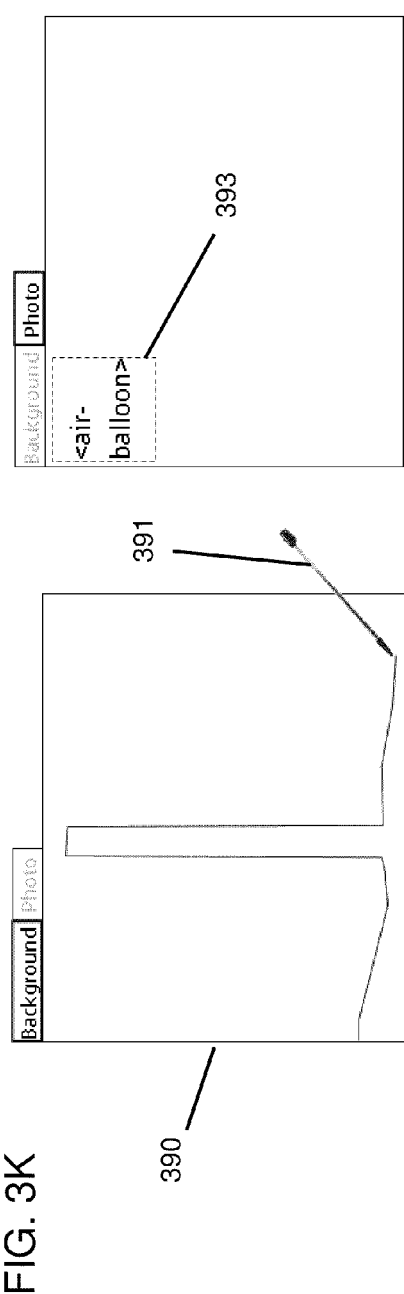
FIG. 3K is an example of a visual search engine user interface allowing the searching of background and foreground images in accordance with one embodiment.
Figure 3L:
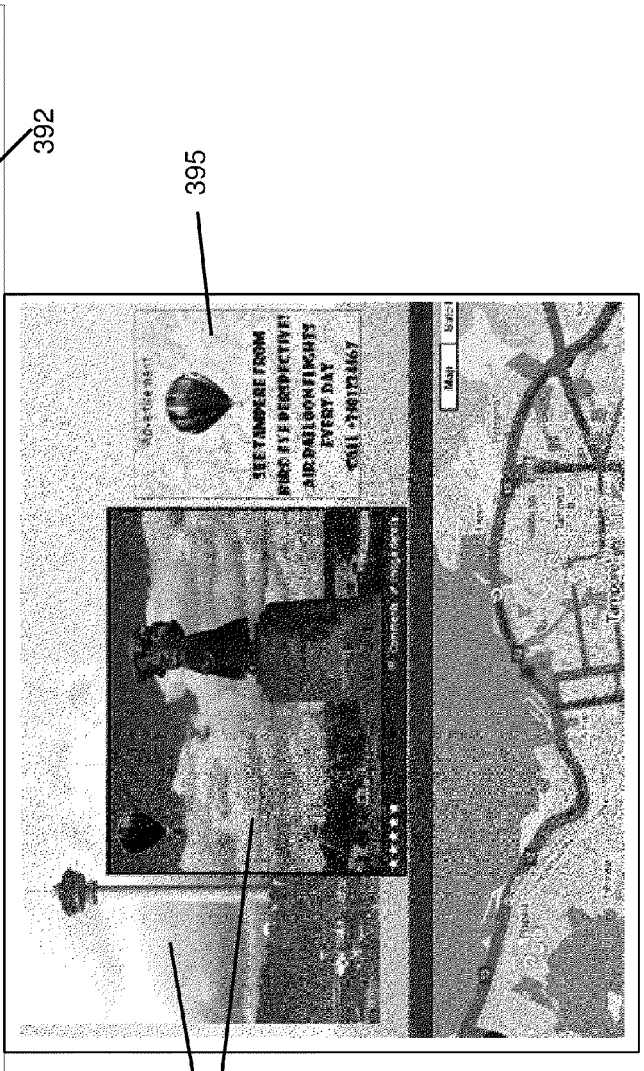
FIG. 3L is an example of graphical search results returned in response to a query of the visual search engine of FIG. 3K.

FIG. 3K is an example of a user interface that allows a user to search for both background images and foreground images. For example, the user may first draw or define a general shape 390 of a background image desired to be found. The user may use a stylus 391 to graphically depict the shape of this background image. Separate from the background image the interface also includes an input screen 392 for defining a search query for a foreground image 393. Based on this combined search criteria, the search engine can locate similar images such as the two images 394 shown in FIG. 3L. If either of the images 394 include information about a geographical location, or similar types of information, then in addition to returning just the images 394, an advertisement 395 (or another object) related to the images or the location of the images may be added and returned as well.

Figure 4:
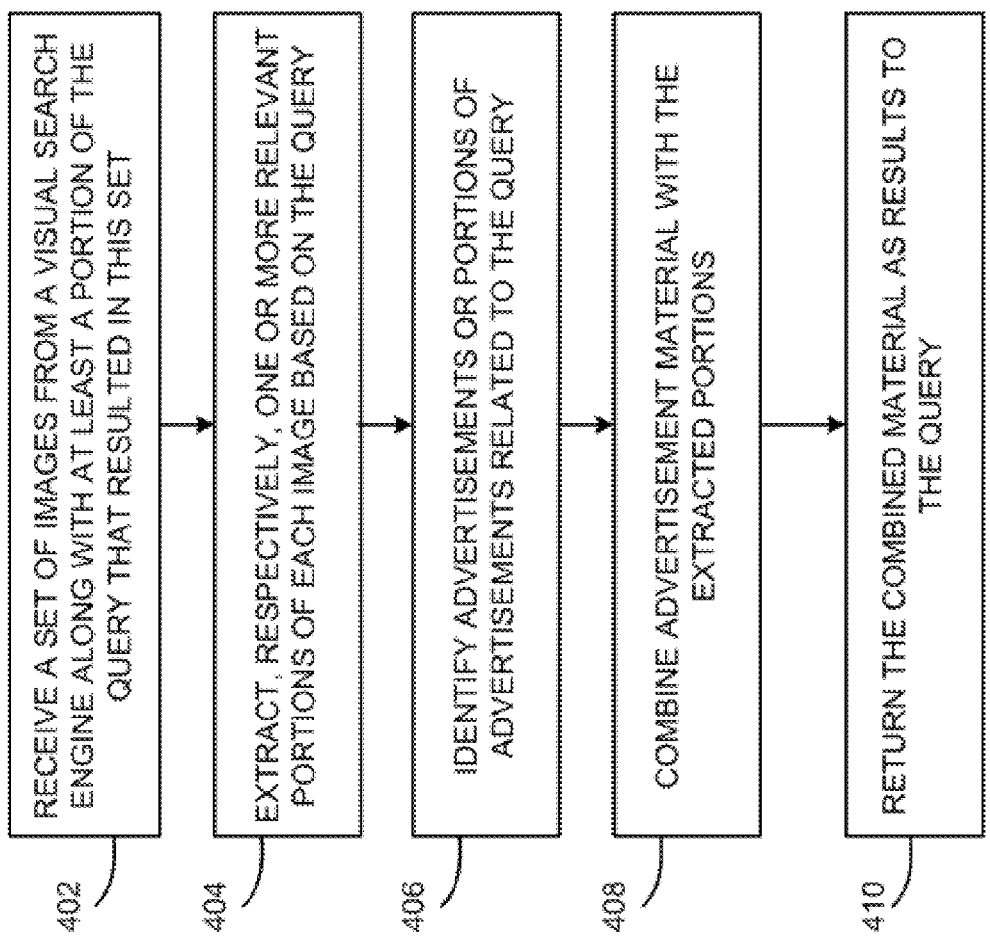
FIG. 4 is a flowchart of a process for combining objects and relevant portions of images, in accordance with one embodiment.

FIG. 4 is a flowchart 400 of a process for combining objects and relevant portions of images that can be used to implement an embodiment of the invention. Just as extracting relevant image portions can be performed by systems other than a search engine, so can the extracting of relevant portions, identifying of related advertising objects, and the combining of the two. In steps 402, 404, a set of images is received from a search engine and relevant portions are extracted based on the search query that generated the resulting set of images, much like the steps 332 and 334 of FIG. 3B.

However, in step 406, advertisements or portions of advertisements are identified which are related to the query. As discussed above, the related advertisements may be selected from specifically designed advertising objects made available for inserting in images or may be portions of general visual advertising material that are extracted before being combined with an image. In a global, or large scale network, environment, different versions of advertising material for the same entity may be available. In this instance, an related advertising object is first identified and then a specific local, regional, or national version of that advertisement is selected for combining with the extracted image portions of the search results. In step 408, whatever related advertising materials are identified are combined with one or more of the extracted image portions. Different ads may be used for the same keyword or tag. The right to have advertising objects added to images having a "dog" may be given to more than one company and therefore a result set having multiple images may have more than one type of ad. Even for the same company, different ads may be used for purposes of variety or purposes of have different promotions at different times. In step 410, the combined material (e.g., the advertising object and a respective extracted image portion) is returned as search result of a set of images.

Figure 5:
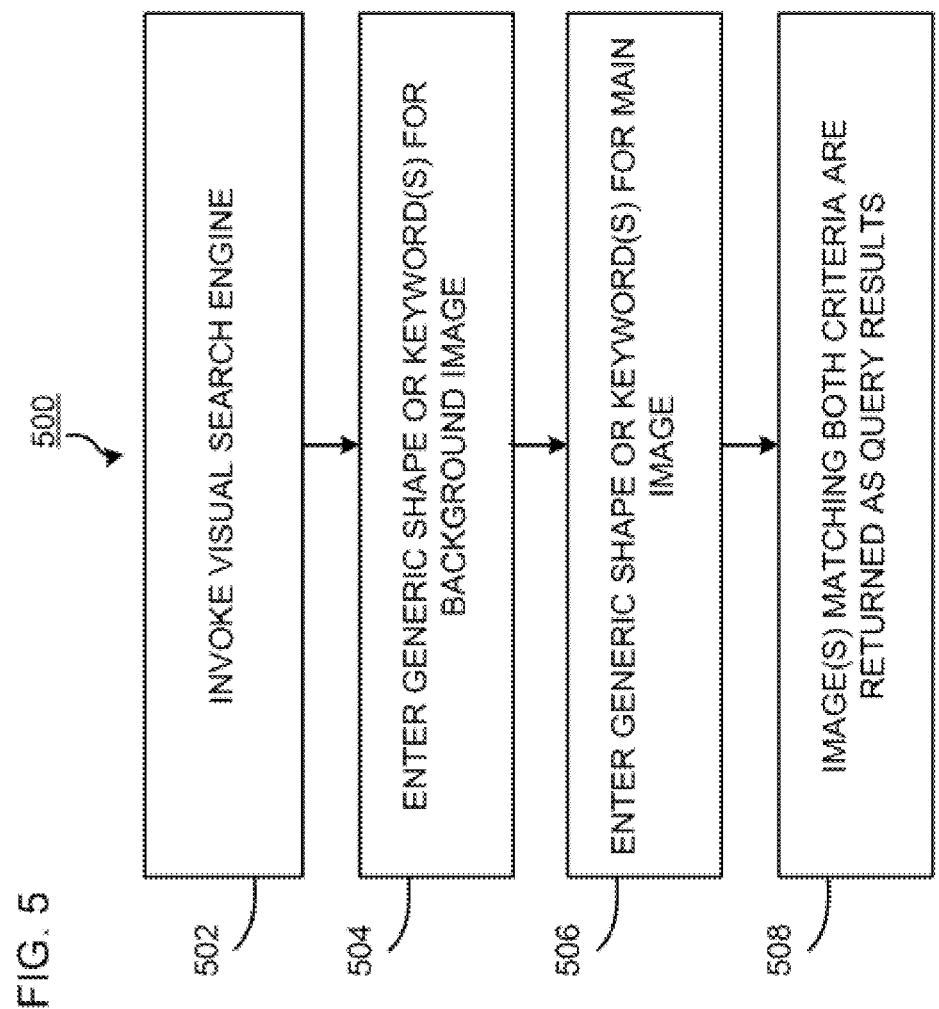
FIG. 5 is a flowchart of a process for forming a search query for image content, in accordance with one embodiment.

In addition to keyword searching for just tagged portions of an image, other type of user interfaces can be utilized to define the image content that is being searched for. FIG. 5 is a flowchart 500 of a process for forming a search query for image content that can be used to implement an embodiment of the invention. After invoking a search engine, in step 502, a user can draw a general shape for a background image, in step 504. The user may also associate keywords with this shape or simply use keywords to describe a background image. In step 506, the user can then similarly describe a foreground image. Based on both the foreground image search criteria and the background image search criteria, the search engine can then identify, in images that match (to a certain degree) both criteria which are retuned, in step 508, as results.

In some instances, the returned image may be association with a particular geographical place or region. This association may be through an explicit tag within the image or it may be inferred from the visual content of the image. In either case, objects such as advertisements, or related hyperlinks, or information about the region may be combined with images before they are returned as a result of a search query.

Figure 6:
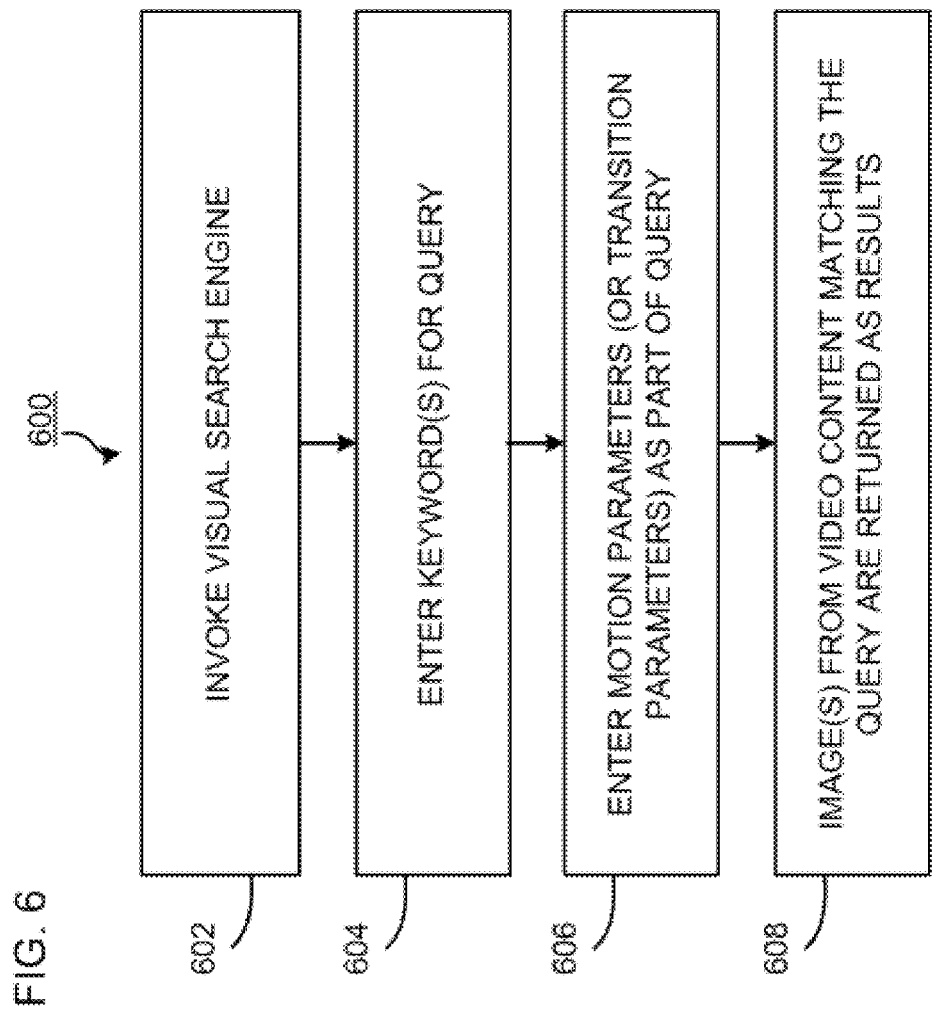
FIG. 6 is a flowchart of a process for forming a search query for video content, in accordance with one embodiment.

FIG. 6 is a flowchart 600 of a process for forming a search query for video content that can be used to implement an embodiment of the invention. In addition to static image searches, searching for visual content within video is also possible. One way to perform this type of searching is to invoke a search engine in step 602 and then, in steps 604 and 606, enter keywords and motion parameters. One example would be to search for video in which a dog travels from the top right corner of the frame in a direction towards the bottom left corner. In this example, the user could enter the keyword "dog" and then draw a starting box on a blank image template and an ending box on that template. One of ordinary skill will recognize that a circle, ellipse, or irregular area may be substituted for either the starting or ending box. The size and location of the starting and ending boxes describes a video sequence in which a dog moves between the two boxes. One optional refinement is that a user may also be allowed to draw a path between the two boxes. In this way, only video sequences where the dog moves similar to the drawn path are considered relevant. In step 608, the images considered relevant are returned as search results that may, or may not, be modified before forwarding to an end user. The entire video sequence may be returned as relevant, just the portion of the video between the starting and ending boxes may be returned or, just one or more of the individual image frames may be returned as relevant depending on the settings and preferences of the user and the search engine.

As one alternative to a motion based search as just described, the search criteria of steps 604 and 606 may relate to transition portions of a video sequence (e.g., fade, direct cut, cross fade, wipe, etc.). The user would specify a starting keyword and/or image box (e.g., cat) and an ending keyword and/or image box (e.g. dog) along with a transition method. Video sequences matching those three criteria would be considered relevant and returned as search results.

In addition, audio files, or the audio portion of video files, may be tagged and searched for as well. As an example, a file of either of those types may be tagged with "<barking>" or "<dog><barking>" and these tags may be included when forming the search query. Furthermore, there may be more than one audio channel within a file. Such as a stereo audio file, one channel may be for sounds related to a source located at the right-side and the other channel may be for sounds related to a source located at the left side. Thus, multiple channels allow a search query to include not only a sound tag but also include a location. Similar to the video example described with respect to FIG. 31, a sound-related query for a video file may be formed in which the query specifies that a <barking> sound occurs and that it travels from the right of the of the image to the left of the image. Additionally, the sound-related search query may relate to a sound and a location, or a sound that is replaced with a different sound.

Figure 7:
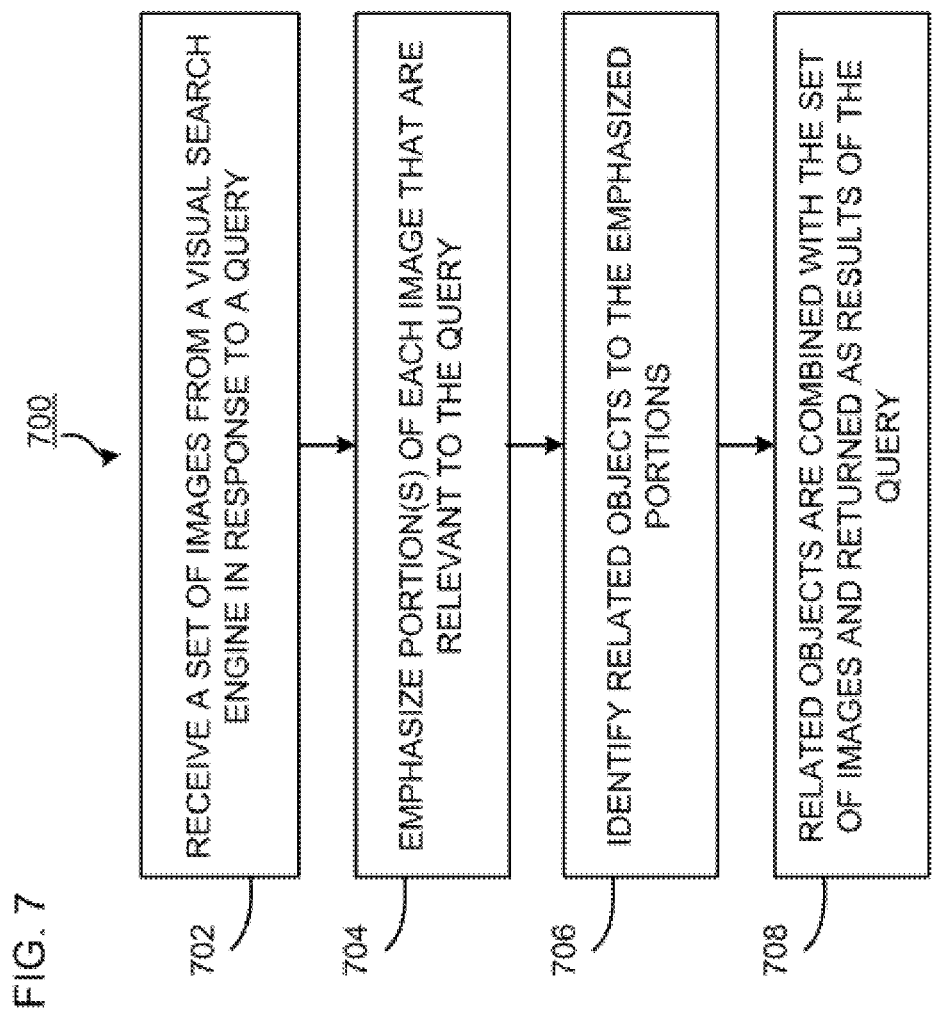
FIG. 7 is a flowchart of a process for modifying image content search results, in accordance with one embodiment.

FIG. 7 is a flowchart 700 of a process for modifying image content search results that can be used to implement an embodiment of the invention. In some of the embodiments described above, the relevant portions of an image were extracted and the other portions were omitted. Other techniques are available to reduce the amount of image content without utilizing complete omission of the less relevant portions of an image. In step 702, a set of matching images are returned from a search engine and in step 704, the relevant portions are emphasized while the other portions are de-emphasized. For example, the contrast of the de-emphasized portions may be adjusted so that that those portions appear faint. Also, the resolution could be adjusted so that those de-emphasized portions appear unfocused. As a result, the manipulated image will appear to have a portion that stands out prominently from its surrounding portions and the set of manipulated images may be returned as the search results to a query.

In step 706, however, related objects to the emphasized portion of an image may be identified. As discussed before, these objects may be advertisements but not necessarily. As an example, a related hyperlink, a related advertisement, a related video clip, or related text may be identified based on a tag associated with the relevant (or emphasized) portion of the image. Then for one or more of the images in the received set of images, the related objects can be combined and returned, in step 708, as search results.

Figure 8:
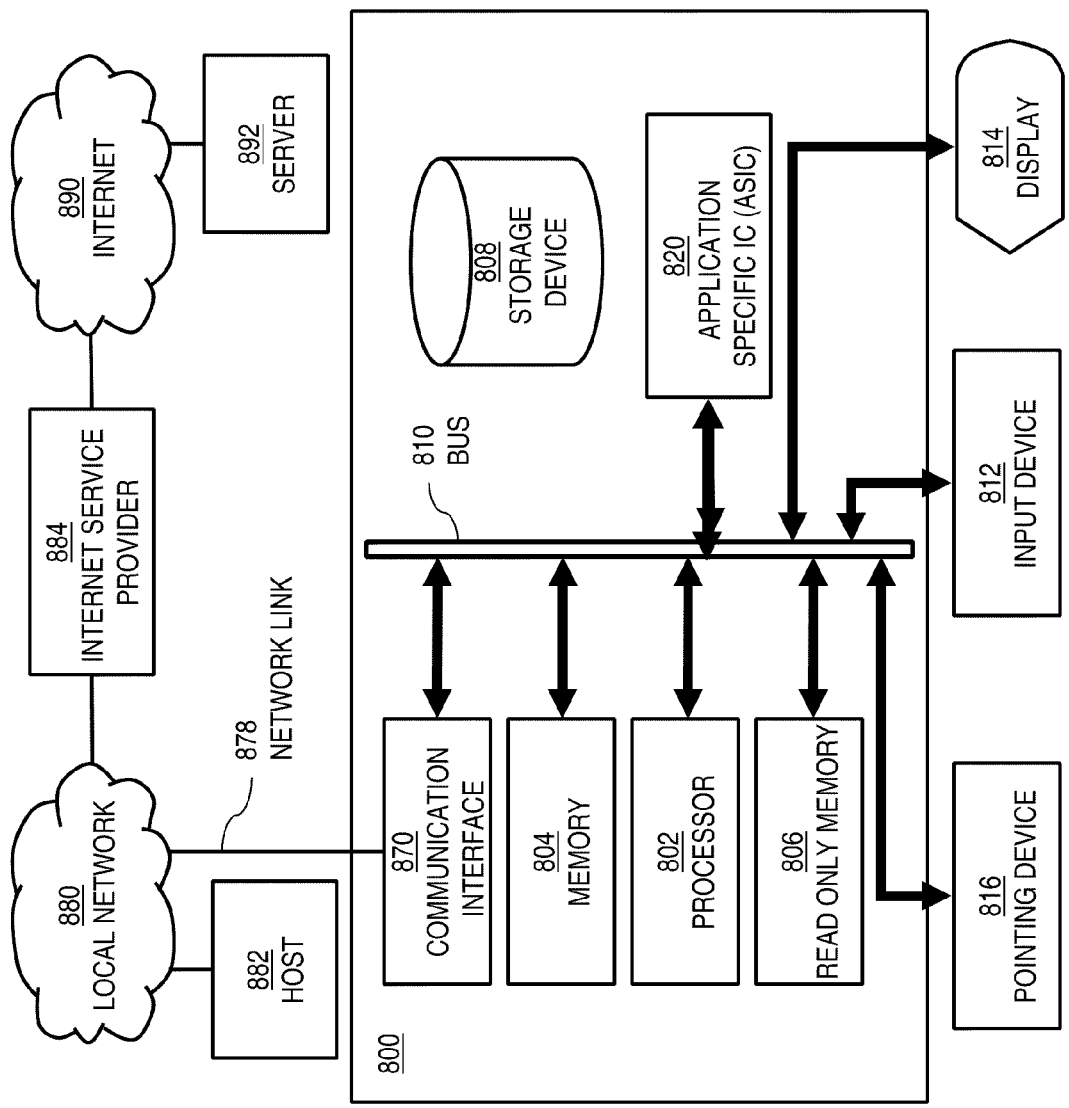
FIG. 8 is a diagram of hardware that can be used to implement an embodiment of the invention.

FIG. 8 illustrates a computer system 800 upon which an embodiment of the invention may be implemented. Computer system 800 is programmed to carry out the inventive functions described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 810 includes one or more parallel conductors of information so that information is transferred quickly among devices coupled to the bus 810. One or more processors 802 for processing information are coupled with the bus 810.

A processor 802 performs a set of operations on information. The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or other dynamic storage device, stores information including processor instructions. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT) or a liquid crystal display (LCD), or a touch screen, or plasma screen or printer for presenting text or images, and a pointing device 816, such as a mouse or a trackball or cursor direction keys, or motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver.

The term computer-readable medium is used herein to refer to any medium that participates in providing information to processor 802, including instructions for execution. Such a medium may take many forms, including, but not limited to, non-volatile media, volatile media and transmission media. Non-volatile media include, for example, optical or magnetic disks, such as storage device 808. Volatile media include, for example, dynamic memory 804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Figure 9:
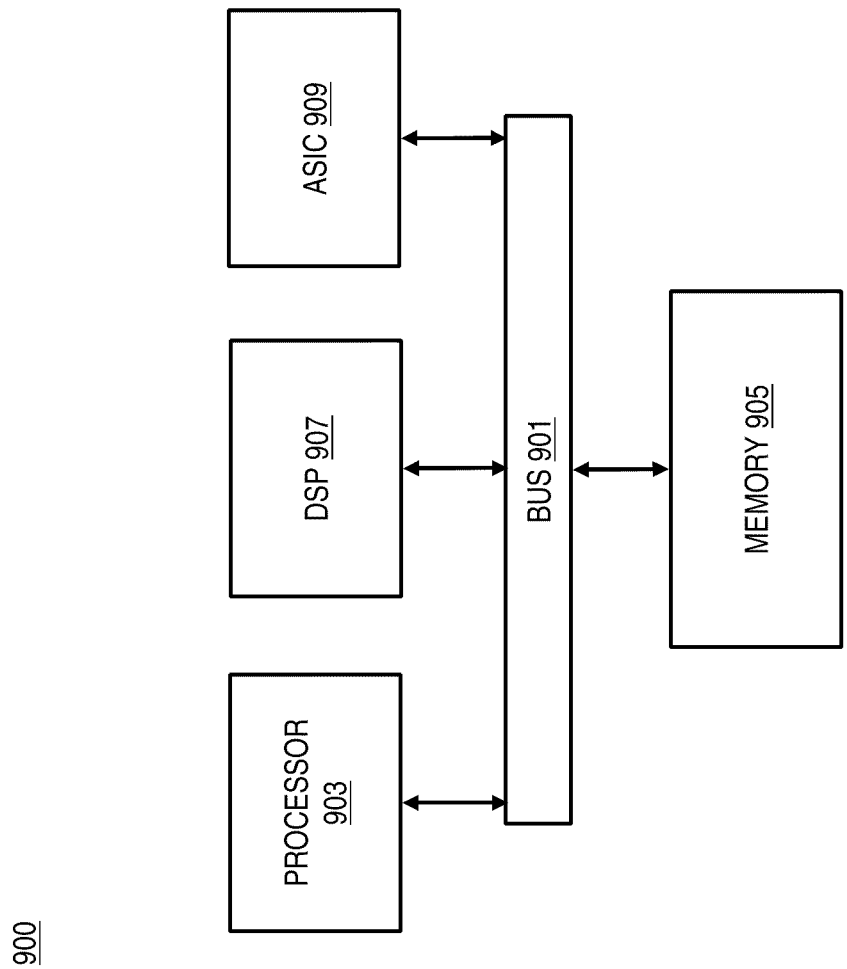
FIG. 9 is a diagram of a chip set that can be used to implement an embodiment of the invention.

FIG. 9 illustrates a chip set 900 upon which an embodiment of the invention may be implemented. Chip set 900 is programmed to carry out the inventive functions described herein and includes, for instance, the processor and memory components described with respect to FIG. 8 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-word signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein. The memory 905 also stores the data associated with or generated by the execution of the inventive steps.

Figure 10:
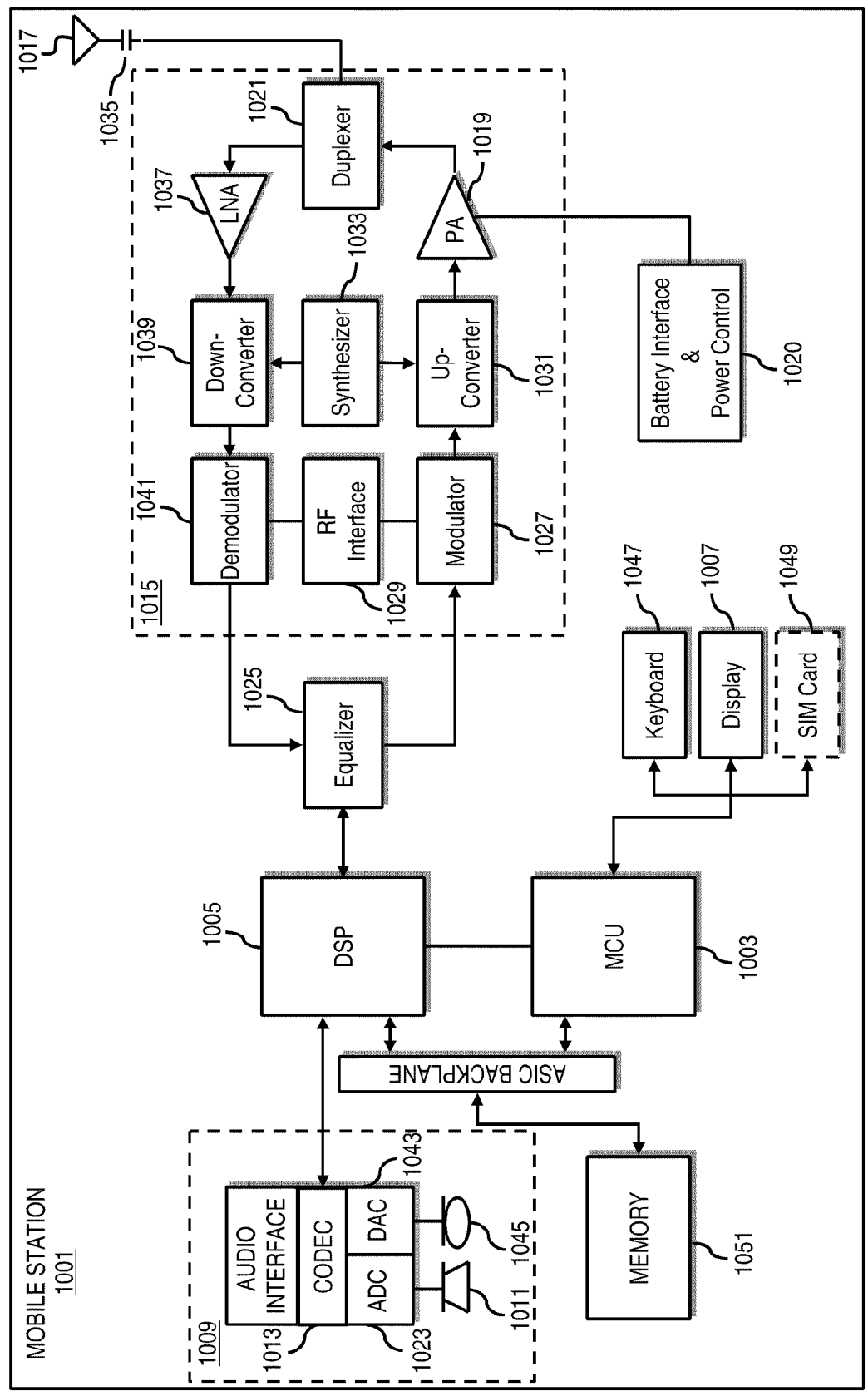
FIG. 10 is a diagram of a mobile station (e.g., handset) that can be used to implement an embodiment of the invention.

FIG. 10 is a diagram of exemplary components of a mobile station (e.g., handset) capable of operating in the system of FIG. 1, according to an exemplary embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile station functions. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile station 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In the exemplary embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003—which can be implemented as a Central Processing Unit (CPU) (not shown).

The MCU 1003 receives various signals including input signals from the keyboard 1047. The MCU 1003 delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the station. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile station 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile station 1001 on a radio network. The card 1049 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A non-transitory computer-readable storage medium carrying one or more sequences of one or more instructions which, when executed by one or more processors, cause an apparatus to at least perform the following steps:
identifying, for each image in a first set of one or more images, a respective portion of each image relevant to a search query by matching one or more keywords of the search query to one or more tags associated with each of the respective portions of each image;
determining to extract, for each image in the first set of one or more images, the respective portion to generate a respective extracted image portion based on a relative similarity of the respective portion to the search query and a threshold of relative similarity;
determining to generate a second set of one or more images, wherein each image of the second set corresponds, respectively, to one of the extracted respective portions; and
for each of the one or more images of the second set, identifying a respective, related object.

2. A computer-readable storage medium of claim 1, wherein the apparatus is caused to further perform:
for each of the one or more images of the second set, determining to combine the respective, related object and each image.

3. A computer-readable storage medium of claim 2, wherein the respective, related object corresponds to an advertisement relevant to the search query.

4. A computer-readable storage medium of claim 1, wherein the apparatus is caused to further perform:
receiving the search query; and
determining the first set of one or more images based on the search query.

5. A computer-readable storage medium of claim 1, wherein each of the respective relevant portions are related to one or more tags.

6. A computer-readable storage medium of claim 5, wherein the apparatus is caused to further perform:
for each of the one or more images of the second set, identifying a respective, related advertising image based on the related one or more tags; and
for each of the one or more images of the second set, combining the respective, related advertising image and each image.

7. A computer-readable storage medium of claim 1, wherein the apparatus is caused to further perform:
returning the second set as results to the search query from a handset configured to communicate over a communication network that includes a wireless network.

8. A computer-readable storage medium of claim 1, wherein generating each image of the second set includes omitting portions of any images other than extracted respective portions.

9. A computer-readable storage medium of claim 1, wherein generating each image of the second set includes obscuring portions of any images other than extracted respective portions.

10. An apparatus comprising:
at least one processor; and
at least one memory including computer program code for one or more programs,
the at least one memory and the computer program code configured to, with the at least one processor, cause the apparatus to perform at least the following,
identify, for each image in a first set of one or more images, a respective portion of each image relevant to a search query by matching one or more keywords of the search query to one or more tags associated with each of the respective portions of each image;
determine to extract, for each image in the first set of one or more images, the respective portion to generate a respective extracted image portion based on a relative similarity of the respective portion to the search query and a threshold of relative similarity;
determine to generate a second set of one or more images, wherein each image of the second set corresponds, respectively, to one of the extracted respective portions; and
for each of the one or more images of the second set, identify a respective, related advertising object.

11. An apparatus of claim 10, wherein the apparatus is further caused to:
for each of the one or more images of the second set, determine to combine the respective, related advertising object and each image.

12. An apparatus of claim 10, wherein generating each image of the second set includes omitting portions of any images other than extracted respective portions.

13. An apparatus of claim 10, wherein the apparatus is further caused to:
receive the search query; and
determine the first set of one or more images based on the search query.

14. An apparatus of claim 10, wherein the apparatus is further caused to:
return the second set as results to the search query from a handset configured to communicate over a communication network that includes a wireless network.

15. An apparatus comprising:
at least one processor; and
at least one memory including computer program code for one or more programs,
the at least one memory and the computer program code configured to, with the at least one processor, cause the apparatus to perform at least the following,
determine to transport a search query to a visual search engine, the search query including one or more keywords;
determine to provide a set of one or more images as results to the search query by matching one or more keywords of the search query to one or more tags associated with each of respective portions of each image, wherein each image of the results includes a portion related to the search query and omits a portion unrelated to the search query based on a relative similarity of the respective portions to the search query and a threshold of relative similarity; and
determine to provide a respective, related advertisement object for each image of the results, wherein the respective, related advertising object is identified for each image.

16. An apparatus of claim 15, wherein the search query includes one of a size of an image and a location within an image.

17. An apparatus of claim 15, wherein each image of the results includes the respective, related advertisement object identified for that image.

18. A method comprising:
determining to transport a search query to a visual search engine, the search query including one or more keywords;
determining to provide a set of one or more images as results to the search query by matching one or more keywords of the search query to one or more tags associated with each of respective portions of each image, wherein each image of the results includes a portion related to the search query and omits a portion unrelated to the search query based on a relative similarity of the respective portions to the search query and a threshold of relative similarity; and
determining to provide a respective, related advertising object for each image of the results, wherein the respective, related advertising object is identified for each image.

19. A method of claim 18, wherein the search query includes one of a size of an image and a location within an image.

20. A method of claim 18, wherein each image of the results includes the respective, related advertisement object identified for that image.

* * * * *